United States Patent Office 3,153,052
Patented Oct. 13, 1964

3,153,052
MANUFACTURE OF DIHYDROCYANOPYRAN
Robert W. Foreman, Chagrin Falls, Ohio, assignor to The Standard Oil Company, Cleveland, Ohio, a corporation of Ohio
No Drawing. Filed Jan. 14, 1963, Ser. No. 251,056
6 Claims. (Cl. 260—345.1)

This invention relates to a novel process for producing dihydrocyanopyrans and more particularly relates to the preparation of 3,4-dihydro-2-cyano pyrans by the thermal reaction of an alpha, beta-olefinically unsaturated aldehyde and an alpha, beta-olefinically unsaturated nitrile.

The reaction which occurs in the process of this invention is believed to be as follows:

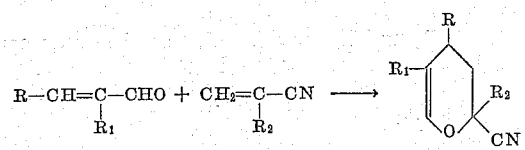

wherein R, $R_1$ and $R_2$ is each selected from the group consisting of hydrogen and a lower alkyl group having from 1 to 4 carbon atoms and wherein R, $R_1$ and $R_2$ may be the same or different. The preferred starting aldehydes and nitriles in this invention are those of the above structure in which R, $R_1$ and $R_2$ are selected from the group consisting of hydrogen and a methyl radical such as crotonaldehyde, acrolein, methacrolein, acrylonitrile and methacrylonitrile.

The only known previous report of the preparation of dihydrocyanopyran from acrolein and acryonitrile appeared in an Alien Property World War II publication (USOPB 73715 fr. 6277–6293, 1942). The actual work was done in the late 1930's by Schulz, an employee of Degussa. The yields and conversions to dihydrocyanopyran obtained by Schulz were quite low. The reaction was carried out in a silver lined autoclave at 160° C., for a period of 5 hours. Approximately equal molar ratios of acrolein to acrylonitrile were employed by Schulz. When the reactants had not been freshly distilled, hydroquinone was employed as the polymerization inhibitor. However, much lower yields of dihydrocyanopyran were obtained when the inhibitor was used. When freshly distilled reactants were employed and the reaction was carried out in the absence of an inhibitor, acrolein dimer was the predominant product (for more details concerning the formation of acrolein dimer see U.S. Patent No. 3,062,838). Conversions to acrolein dimer and to dihydrocyanopyran based on the acrolein reactant were 15.7 and 7.3 respectively. Yields based on acrolein were below 80% although insufficient data were presented to calculate this with exactness. Dihydrocyanopyrans have also been prepared by a different procedure using dihydropyran and phosgene as reactants (J. Org. Chem. 25, 152 (1960)).

In accordance with the present invention, per pass conversion of acrolein to dihydrocyanopyran in excess of 35% by weight with about a 3:1 weight ratio of dihydrocyanopyran to acrolein dimer are easily obtainable. The present process may be carried out in any conventional reactor such as an enclosed steel vessel and optimum results are obtained in a temperature range of from about 150 to 250° C. and preferably from about 190 to 230° C., with a mole ratio of acrylonitrile to acrolein of from about 10:1 to 25:1 and a reaction time of from about ½ to 5 hours. The present process is also preferably carried out in an oxygen-free atmosphere and under autogenous pressure. Acrolein dimer is the only significant by-product so that the yield of dihydrocyanopyran plus acrolein dimer is usually greater than 90% of theory. The reaction is preferably carried out in the presence of a polymerization inhibitor. Although nitric oxide is the preferred polymerization inhibitor, satisfactory results are obtained with other known inhibitors such as ethylene diamine tetraacetic acid and similar materials more fully disclosed in U.S. Patent No. 3,062,838; hydroquinone or hydroquinone monomethyl ether and the like.

Dihydrocyanopyran is a colorless, mobile liquid which is insoluble in water, but soluble in most common organic solvents. Dihydrocyanopyrans are useful as a solvent for polymers and the solutions formed by dissolving various polymers in 3,4-dihydro-2-cyano-2-H pyran, for instance, are useful for casting films, fibers and other useful shaped articles by known procedures. 3,4-dihydro-2-cyano-2-H pyran, for instance, is an excellent solvent for polymethyl methacrylate and for polystyrene.

The structures and chemical nature of the dihydrocyanopyrans prepared by the instant process were verified by infrared, carbon, hydrogen and nitrogen analysis and NMR analysis.

The following example will illustrate further the process of the present invention:

EXAMPLE

The apparatus employed in most of the experiments consisted of a 1 liter, stirred, electrically heated, stainless steel autoclave equipped with a liquid dip tube. Some of the experiments were carried out in a similar carbon steel autoclave. Nitrogen was bubbled through the acrylonitrile contained in the autoclave for about ten to fifteen minutes. Meanwhile, acrolein was distilled under nitrogen and then added to the autoclave just prior to closing and sealing. The autoclave was then pressured with nitrogen to 2 or 3 atmospheres, the nitrogen pressure being released 3 or 4 times to purge the reactor. Then the required amount of nitric oxide was added from a hypodermic syringe.

Experiments wherein acrolein was added gradually were done employing a Lapp pump to introduce the acrolein under pressure. The autoclave was then placed in the heater, the stirrer was attached, and heating was commenced. The reaction mixture was then heated to the desired reaction temperature in from about 1 to 1½ hours and the reaction was then continued for from 1 to 5 hours. At the end of the reaction the autoclave was cooled with cold water to about 50° C. below the reaction temperature and the liquid dip tube was opened. The bulk of the contents then exited through a water-cooled condenser and into an ice cooled flask. An alternate procedure consisted of cooling the entire autoclave to about 120 to 150° C., transferring it rapidly to an ice water bath and then opening the reactor when the pressure reached atmospheric.

For the purpose of concentrating the reaction products a flash evaporator was used to remove the bulk of the volatile materials. The final distillation to produce pure dihydrocyanopyran and pure acrolein dimer were done in a Nester-Faust spinning band column under reduced pressure. Analyses were performed primarily by vapor chromatography.

The results of several experiments are summarized in the following table. The temperature range investigated extended from about 160 to 230° C. At 160° C., acrolein dimer predominated over dihydrocyanopyran, as was demonstrated earlier by Schulz; however, at 190° C. and higher, dihydrocyanopyran becomes the predominant product and overall conversion is higher. These experiments were conducted at a 10:1 or higher mole ratio of acrylonitrile to acrolein, which appears to be at or near the optimum ratio for this reaction. At lower acrylonitrile-to-acrolein ratios a somewhat higher temperature was required for optimum dihydrocyanopyran production.

Effective mole ratios of acrylonitrile to acrolein for conversion to dihydrocyanopyran are shown in the table. While the conversion at 220° C. changes only slightly with an increased ratio, the dihydrocyanopyran-acrolein dimer ratio is favored by higher ratios of acrylonitrile-acrolein.

Reaction time was found to be an important variable as shown in the table. Longer reaction times favor dihydrocyanopyran conversions with only slight increase in acrolein dimer formation. However, polymer formation in the long duration experiments is detrimental.

The effect of various inhibitors on polymer formation has been demonstrated. Nitric oxide and ethylene diamine tetraacetic acid are effective polymer inhibitors and the combination of the methyl ether of hydroquinone and hydroquinone have some beneficial effect in reducing polymer formation. The concentration of the inhibitor does not appear to be critical.

Some beneficial effect was obtained when acrolein was added gradually to the reaction mixture during the reaction as compared with a batch reactor procedure. The per pass conversion of acrolein dimer was appreciably reduced by the procedure employing gradual addition of acrolein to the reaction.

The use of distilled reactants was investigated and a number of experiments in which acrylonitrile and acrolein obtained from the previous reaction were reused were carried out with no noticeable change in results.

Similar results were obtained when methacrylonitrile was used in place of acrylonitrile and when either methacrolein or crotonaldehyde was used in place of acrolein in the foregoing reaction.

Table

| Mole Ratio, Acrylonitrile Acrolein | Cc. of No. | Temp., °C | Time, Hours | Percent per pass conversion | |
|---|---|---|---|---|---|
| | | | | Dihydrocyanopyran | Acrolein Dimer |
| 9:1 | 250 | 160 | 5 | 4.92 | 8.04 |
| 19.3:1 | 250 | 190 | 5 | 22.5 | 15.5 |
| 19.3:1 | 250 | 220 | 1½ | 21.7 | 13.3 |
| 10:1 | 500 | 209–216 | 1¼ | 21.8 | 19.0 |
| 14:1 | 250 | 220 | 1½ | 23.1 | 17.9 |
| 19.3:1 | 250 | 220 | 1½ | 21.7 | 13.3 |
| 19.3:1 | 250 | 220 | ½ | 9.7 | 8.6 |
| 19.3:1 | 250 | 220 | 2¾ | 29.9 | 14.0 |
| 15:1 | 250 | 206–231 | 2 | 34.0 | 10.0 |
| 10:1* | 250 | 210–220 | 3 | 27.7 | 22.0 |
| 10:1** | 250 | 210–220 | 4½ | 24.9 | 11.5 |
| 15:1 | 250 | 215 | 2 | 37.0 | 28.8 |

*Gradual acrolein feed.
**Acrolein added in 3 equal incremental portions during reaction.

I claim:
1. In the process for preparing 3,4-dihydro-2-cyanopyrans by the reaction of an aldehyde having the structure

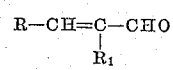

with a nitrile having the structure

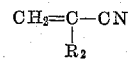

wherein R, $R_1$ and $R_2$ are selected from the group consisting of hydrogen and an alkyl group having from 1 to 4 carbon atoms, the improvement comprising employing a mole ratio of said nitrile to said aldehyde of from about 10:1 to 25:1, a reaction temperature of from about 150 to 250° C. and a reaction time of from about ½ to 5 hours in the presence of a polymerization inhibitor and in a substantially oxygen-free atmosphere.

2. The process of claim 1 wherein the aldehyde is acrolein and the nitrile is acrylonitrile.

3. The process of claim 2 wherein the reaction temperature is from 190 to 230° C. and the polymerization inhibitor is nitric oxide.

4. The process of claim 3 wherein the mole ratio of acrylonitrile to acrolein is about 15:1.

5. The process of claim 3 wherein the mole ratio of acrylonitrile to acrolein is about 10:1.

6. The process of claim 3 wherein the mole ratio of acrylonitrile to acrolein is about 20:1.

References Cited in the file of this patent

Schulz et al.: Angewandte Chemie, vol. 62, pp. 105–118 (1950).

Fiesselmann et al.: Chemische Berichte, vol. 89, pp. 27–39 (1956).

Smith et al.: Journal American Chemical Society, vol. 73, pp. 5270–5272 (1951).